(12) United States Patent
Nakayama et al.

(10) Patent No.: US 6,704,386 B2
(45) Date of Patent: Mar. 9, 2004

(54) FUEL CHANNEL BOX AND A METHOD OF MANUFACTURING THE SAME

(75) Inventors: Michio Nakayama, Hitachi (JP); Takehiro Seto, Hitachi (JP); Tatsuo Seki, Hitachi (JP); Isao Kurihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/285,421

(22) Filed: Nov. 1, 2002

(65) Prior Publication Data

US 2003/0053582 A1 Mar. 20, 2003

Related U.S. Application Data

(62) Division of application No. 09/760,778, filed on Jan. 17, 2001.

(30) Foreign Application Priority Data

Jan. 21, 2000 (JP) .......................................... 2000-17752

(51) Int. Cl.[7] ................................................ G21C 3/07
(52) U.S. Cl. ..................................... 376/260; 148/672
(58) Field of Search ........................... 376/260; 148/672

(56) References Cited

U.S. PATENT DOCUMENTS 4,142,713 A * 3/1979 Nakasugi et al. .............. 266/87
4,548,657 A 10/1985 Eddens ........................ 148/133
5,862,194 A 1/1999 Fujieda et al. ............... 376/260

FOREIGN PATENT DOCUMENTS

| | | |
|---|---|---|
| EP | 0488027 A1 | 6/1992 |
| EP | 0795618 A1 | 9/1997 |
| EP | 0937575 A1 | 8/1999 |
| JP | 59-16956 | 1/1984 |
| JP | 59-229475 | 12/1984 |
| JP | 62-200286 | 9/1987 |
| JP | 5-17837 | 1/1993 |
| JP | 5-80170 | 4/1993 |
| JP | 9-249927 | 9/1997 |
| JP | 11231083 | 8/1999 |

* cited by examiner

*Primary Examiner*—Michael J. Carone
*Assistant Examiner*—Daniel Matz
(74) *Attorney, Agent, or Firm*—McDermott, Will & Emery (57) ABSTRACT

A fuel channel box manufacturing method processes a fuel channel box of a zirconium-base alloy by a beta-quench treatment that heats the fuel channel box by a heating coil. The distance between the heating coil and the opposite walls of the fuel channel box is controlled so that temperature differences between the opposite walls of the fuel channel box are reduced. The fuel channel box of a zirconium-base alloy is heated at a temperature in a temperature range including β-phase temperatures so that temperature difference between the opposite walls is 50° C. or below. The fuel channel box manufacturing method is capable of manufacturing a fuel channel box that is not subject to significant irradiated bow even if a deflection is produced therein originally when the same is manufactured and of manufacturing the fuel channel box at a high production efficiency.

9 Claims, 7 Drawing Sheets

FUEL CHANNEL BOX AND A METHOD OF MANUFACTURING THE SAME

This application is a divisional of application Ser. No. 09/760,778 filed Jan. 17, 2001.

BACKGROUND OF THE INVENTION

The present invention relates to a fuel channel box for forming a fuel assembly for a boiling water reactor and, more particularly, to a fuel channel box resistant to flexural deflection due to exposure to neutron irradiation, and a method of manufacturing such a fuel channel box.

A method of uniformizing the exposure dose rates of fuel assemblies by changing the positions of the fuel assemblies in a reactor has been studied to prevent the flexural deflection of fuel channel boxes due to irregular neutron exposure dose rates. Hereinafter, flexural deflection due to exposure to neutron irradiation will be referred to as "irradiated bow". However, irradiated bow has not been prevented yet. Irradiated bow reduces a space for the movement of a control rod and changes fission reactivity. Thus, irradiated bow is a principal factor that shortens the life of the fuel channel box.

Techniques for randomizing the orientations of crystal grains to prevent irradiated bow are disclosed in Japanese Patent Laid-open Nos. Sho 59-229475, Sho 62-200286, Hei 5-17837, Hei 5-80170 and Hei 9-249927.

The technique disclosed in Japanese Patent Laid-open No. Hei 9-249927 restrains the upper and the lower end of a heating coil from movement in all lateral directions by rollers so that clearance between the heating coil and a fuel channel box may not change and heats the fuel channel box at a temperature uniformly over the entire width of the walls of the fuel channel box.

However, the fuel channel box is a welded structure originally warped and twisted with respect to a longitudinal direction within tolerances. Therefore, the clearance between the heating coil and the fuel channel box changes, causing temperature difference between the opposite walls of the fuel channel box. The temperature difference between the opposite walls causes difference in orientation (FL value) with respect to the longitudinal direction (rolling direction) between the opposite walls, which results in flexural deflection.

A method of reducing the orientation difference AFL between the orientations of the opposite walls subjects the fuel channel box to heat treatment a plurality of times, which, however, reduces production efficiency.

Japanese Patent Laid-open No. Sho 59-16956 and U.S. Pat. No. 4,548,657 disclose techniques that heat a pair of adjacent walls of a fuel channel box at a temperature in a temperature range including β-phase temperatures and heat other walls at a temperature in a temperature range including α+β-phase temperatures to control deflecting direction. These techniques take nothing about deflection due to temperature difference between the opposite walls into account.

SUMMARY OF THE INVENTION

It is an object of the present invention to provide a fuel channel box that is not subject to significant irradiated bow even if a bow is produced therein originally when the same is manufactured and can be manufactured at a high production efficiency, and a method of manufacturing such a fuel channel box.

According to a first aspect of the present invention, distance between a heating coil and a fuel channel box of a Zr alloy is controlled so that temperature difference between the opposite walls of the fuel channel box is reduced when heating the fuel channel box at a temperature in a temperature range including β-phase temperatures for beta-quench treatment. The temperature range including β-phase temperatures is a temperature range beyond 980° C., preferably a temperature range of 1050 to 1350° C., more preferably, a temperature range of 1050 to 1200° C.

According to another aspect of the present invention, a fuel channel box of a Zr alloy is heated at a temperature in a temperature range including β-phase temperatures so that temperature difference between the opposite walls of the fuel channel box is 50° C. or below, preferably, 10° C. or below.

The fuel channel box treated for beta-quench treatment has a characteristic to limit a flexural deflection due to exposure to neutron irradiation at a burnup of 55 GWd/t to 1.8 mm or below. Preferably, the fuel channel box of the present invention has a characteristic to limit a flexural deflection due to exposure to neutron irradiation at a burnup of 70 GWd/t to 1.6 mm or below.

DESCRIPTION OF THE PREFERRED EMBODIMENTS

Figure 1:
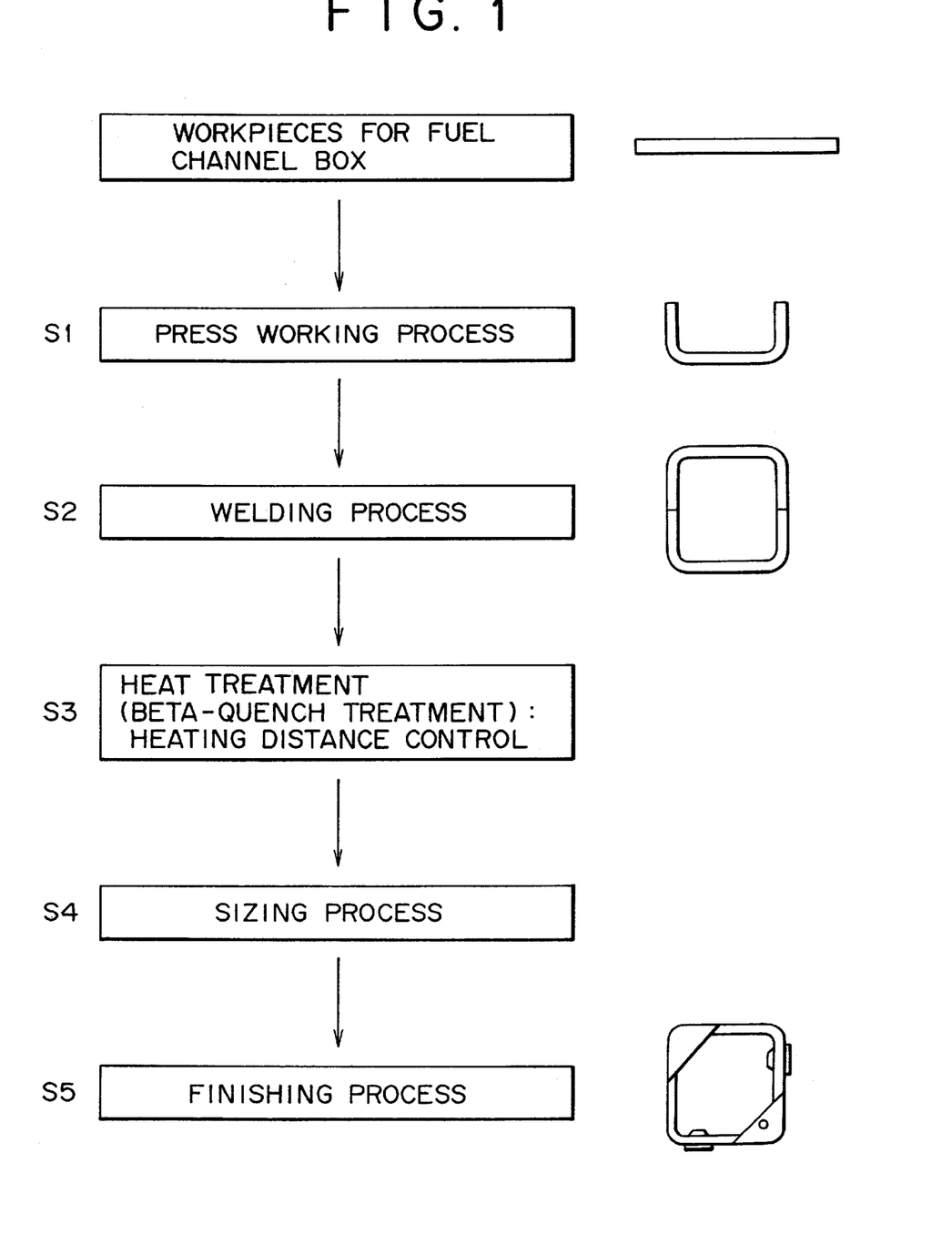
FIG. 1 is a flow chart of a fuel channel box manufacturing method according to the present invention.

Preferred embodiments of the present invention will be described with reference to the drawings. FIG. 1 is a flow chart of a method of manufacturing a fuel channel box (hereinafter referred to simply as "channel box") according to the present invention. Referring to FIG. 1, sheets of a Zr alloy are bent by press work to form channels of a U-shaped cross section in step S1. The edges of flanges of the channels are welded together by butt welding in step S2 to form a square pipe.

In step S3, the square pipe is subjected to a heat treatment (beta-quench treatment) to improve the corrosion resistance of the square pipe. Processing conditions for the heat treatment are, for example, heating temperature: 1100° C. and holding time: 10 s. The square pipe processed by the beta-quench treatment of the foregoing processing conditions has an FL value of about 0.333 and the orientation of texture is perfectly random. Under those processing conditions, a heating coil is moved and the distance between the heating coil and the channel box (hereinafter referred to as "heating distance") is controlled so as to reduce the temperature difference between the opposite walls of the channel box.

Figure 2:
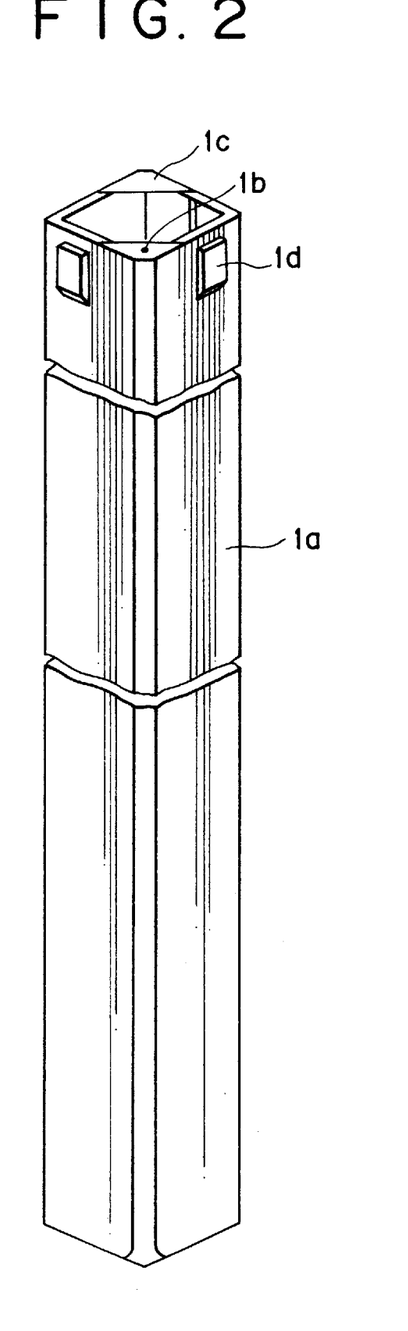
FIG. 2 is a schematic perspective view of a finished fuel channel box finished by step S5 of the fuel channel box manufacturing method.

In step S4, the square pipe is subjected to a sizing process to improve the dimensional accuracy of the square pipe and to cut the square pipe in a fixed length corresponding to that of a channel box. In step S5, the square pipe is subjected to a finishing process that attaches clips 1b and 1c and channel spacers 1d to a channel box body 1a, i.e., the square pipe. FIG. 2 shows the channel box finished by step S5.

Figure 3:
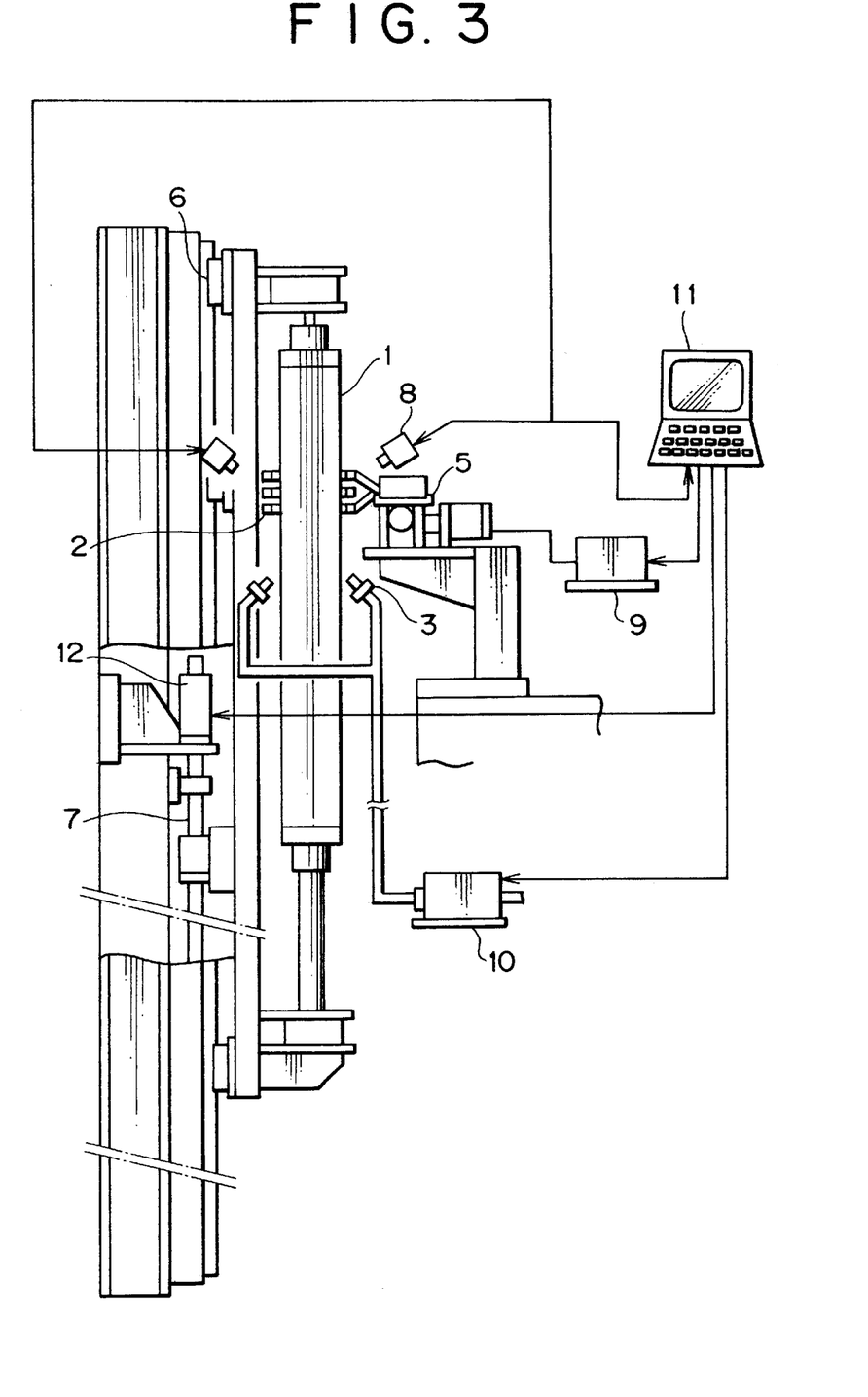
FIG. 3 is a schematic view of a fuel channel box hardening apparatus employed in step S3 of the fuel channel box manufacturing method.

Referring to FIG. 3 showing a fuel channel box hardening apparatus employed in step S3 of the fuel channel box manufacturing method. The fuel channel box hardening apparatus comprises a heating coil (high-frequency induction coil) 2, nozzles 3, a coil moving device 5, a linear roller guide 6, noncontact thermometers 8, a power supply unit 9, a cooling water supply device 10 and a controller 11.

The linear roller guide 6 moves the channel box 1 continuously in a longitudinal direction, i.e., an axial direction vertical as viewed in FIG. 3. The controller 11 controls a drive motor 12 to control the rotating speed of the threaded rod of a ball screw 7 so that the channel box 1 is moved longitudinally at a substantially constant moving speed. The moving speed is low enough for heating the channel box 1 by the heating coil 2 for the sufficient beta-quench treatment of the channel box 1. Thus, the substantially entire length of the channel box 1 is treated by the beta-quench treatment.

The heating coil 2 has a substantially square cross section and heats the channel box 1 of the Zr alloy for beta-quench treatment. The coil moving device 5 moves the heating coil 2 in a plane perpendicular to the center axis of the channel box 1. The power supply unit 9 supplies power to the heating coil 2 and the coil moving device 5. The controller 11 controls the channel box moving speed of the linear roller guide 6 and the high-frequency power supplied by the power supply unit 9 to the heating coil 2 so that channel box 1 is heated at a heating temperature of 1100° C. and is held at the heating temperature for a holding time of 10 s for the beta-quench treatment.

The noncontact thermometers 8 are disposed opposite to the four walls of the channel box 1 to measure the temperatures of the four walls, respectively. The noncontact thermometers 8 measure the temperatures of portions of surfaces of the walls corresponding to the heating coil 2 (heated surfaces), respectively. The controller 11 controls the high-frequency power supplied by the power supply unit 9 to the heating coil 2 on the basis of temperatures measured by the noncontact thermometers 8 so that the heated surfaces are heated at the heating temperature (1100° C.). The controller 11 calculates the temperature difference between the opposite walls of the channel box 1 by using the temperatures measured by the noncontact thermometers 8 and controls the coil moving device 5 to adjust the heating distance so that the temperature distance is reduced to a minimum, which will be described later. Practically, the irradiated bow of the channel box 1 is small when the temperature difference is 50° C. or below. Thus, the channel box 1 is substantially uniformly heated for the beta-quench treatment.

The cooling water supply device 10 supplies cooling water to the nozzle 3 to jet the cooling water through the nozzles 3 against the channel box 1. The nozzles 3 are disposed opposite to the four walls of the channel box 1, respectively, to cool the beta-quench-treated surfaces of the walls of the channel box 1 with the cooling water. The controller 11 controls the cooling water supply device to adjust the flow of the cooling water jetted through the nozzles 3 so that the walls of the channel box 1 are cooled at a temperature dropping rate in the range of 100 to 250° C./s. Preferably, the temperature of the cooling water is in the range of 40 to 90° C. to prevent the excessively rapid cooling of the channel box 1. Desirably, the cooling water is jetted through the nozzles 3 at equal flow rates. Thus, the beta-quench-treated channel box 1 is cooled substantially uniformly. The entire length of the heated walls of the channel box 1 can be sufficiently cooled by moving the channel box 1 longitudinally.

Figure 4:
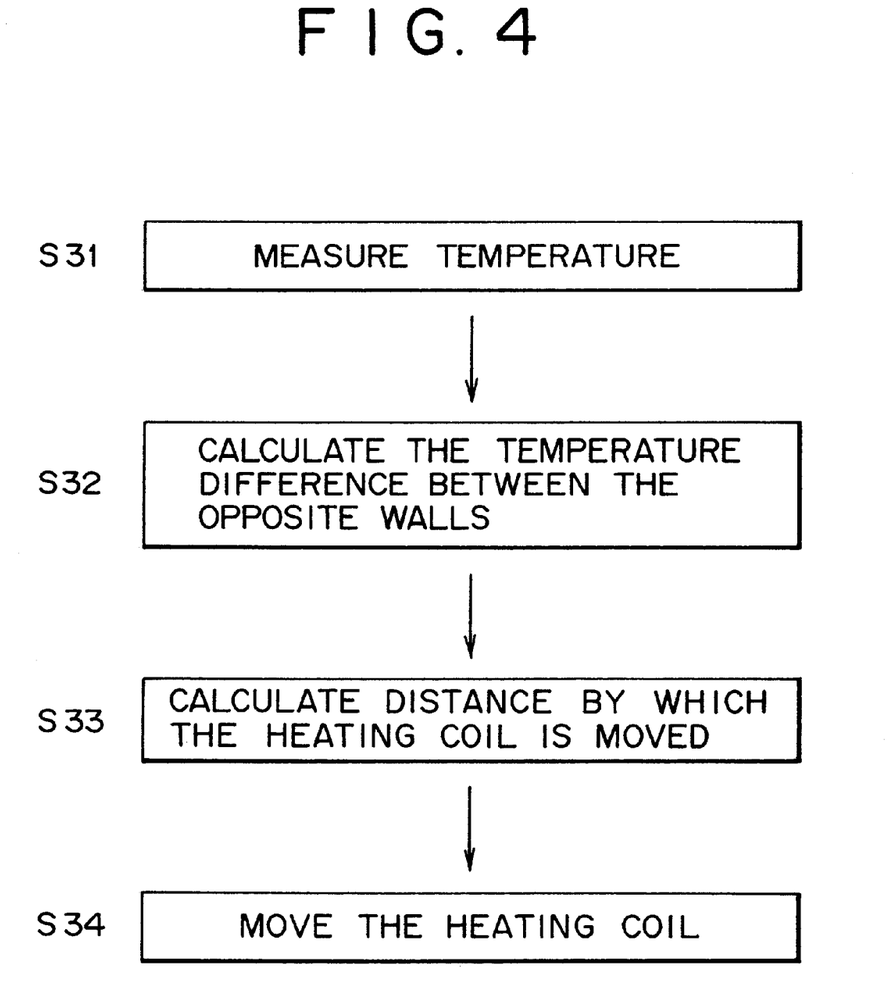
FIG. 4 is a flow chart of a heating distance control method to be executed in step S3 of the fuel channel box manufacturing method.

A method of controlling the heating distance to be executed in step S3 of the method shown in FIG. 1 will be described with reference to FIGS. 4 and 5. FIG. 4 is a flow chart of the heating distance control method and FIGS. 5A, 5B and 5C are views showing the positional relation between the heating coil 2 and the fuel channel box 1.

If the channel box 1 has a deflection or a twist with respect to a longitudinal direction, the heating distance varies irregularly when the channel box 1 is moved longitudinally by the linear roller guide 6 and, consequently, the opposite walls of the channel box 1 are heated at different temperatures, respectively. In a state shown in FIG. 5A, the heating distance on the front side (the lower side as viewed in FIG. 5A) of the channel box 1 is smaller than that on the back side (the upper side as viewed in FIG. 5A) of the same, and the heating distances on the left right and the left side of the channel box 1 are the same. In FIGS. 5A, 5B and 5C, chain lines are center lines of the heating coil 2, a y-axis, not shown, extends vertically and an x-axis extends horizontally.

In step S31, the temperatures of the walls of the channel box 1 are measured by the noncontact thermometers 8, and the temperature differences between the opposite walls are calculated in step S32. For example, in the state shown in FIG. 5A, measured temperatures of the back surface (upper surface in FIG. 5A), the front surface (lower surface in FIG. 5A), the left surface and the right surface are T1, T2, T3 and T4, the temperature difference between the back and the front surface is T1−T2, and the temperature difference between the left and the right surface is T3−T4.

In step S33, a moving distance of the heating coil 2 (correction distance) is calculated on the basis of the temperature differences. In the state shown in FIG. 5A, T1−T2<0 because the heating distance on the front side is smaller than that on the back side. A y-axis displacement Δy along the y-axis is calculated by using: Δy=k(T1−T2), where k is a conversion coefficient for converting temperature difference into displacement. The heating coil 2 is moved forward (downward as viewed in FIG. 5A) when Δy<0, and is moved backward (upward as viewed in FIG. 5A) when Δy>0. The conversion coefficient k may be determined on the basis of the empirically or analytically determined relation between temperature difference and displacement.

Figure 5A:
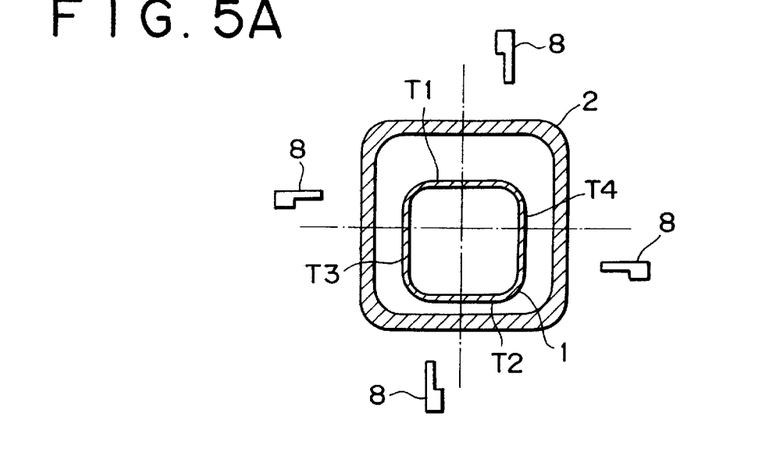
FIG. 5A is a sectional view showing the positional relation between a heating coil and a fuel channel box before moving the heating coil in carrying out the heating distance control method shown in FIG. 4.
Figure 5B:
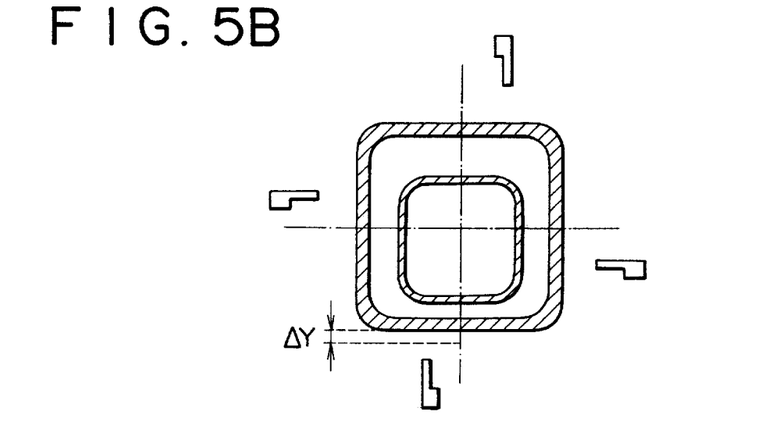
FIG. 5B is a sectional view showing the positional relation between the heating coil and the fuel channel box before moving the heating coil in carrying out the heating distance control method shown in FIG. 4.
Figure 5C:
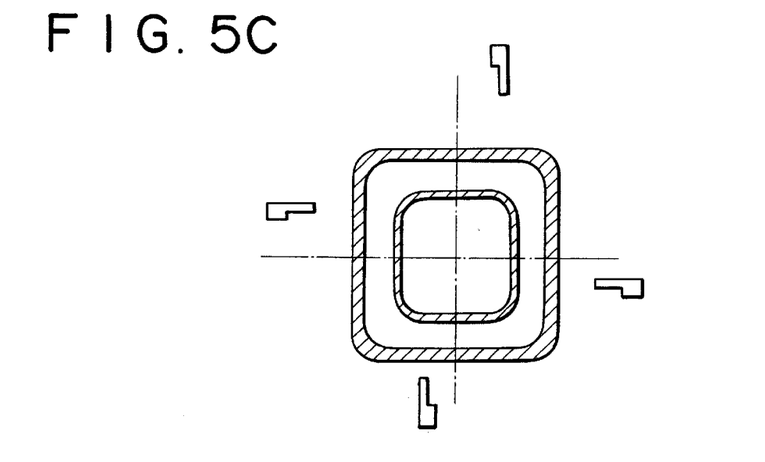
FIG. 5C is a sectional view showing the positional relation between the heating coil and the fuel channel box after moving the heating coil in carrying out the heating distance control method shown in FIG. 4.

In the state shown in FIG. 5A, the heating distances on the right and the left side of the channel box 1 are equal to each other and hence T3−T4=0. Therefore an x-axis displacement Δx=0. The heating coil is moved to the right when Δx<0 and the same is moved to the left when Δx>0. The x-axis displacement Δx, similarly to the y-axis displacement Δy, may be calculated by using an expression represented by temperature difference and a conversion coefficient. An operation for calculating the temperature differences in step S32 and an operation for calculating the displacements Δy and Δx in step S33 are carried out by the controller 11.

Suppose that k=0.002 mm/° C. (2 μm/° C.) and T1−T2=−60° C. in the state shown in FIG. 5A, a forward displacement Δy=120 μm. When T1−T2=−10° C., a forward displacement Δy=20 μm.

In step S34, the heating coil 2 is moved in a horizontal plane along the y-axis by the calculated displacement Δy and/or along the x-axis by the calculated displacement Δx. In the state shown in FIG. 5A, the heating coil 2 is moved only forward by the displacement Δy. The controller 11 controls the power supplied by the power supply unit 9 to the coil moving device 5 to control the movement of the heating coil 2.

The temperature differences between the opposite walls of the channel box 1 can be reduced to the least possible extent and the substantially entire length of the channel box 1 can be beta-quench-treated by shifting the heating coil 2 at a moving speed far higher than that at which the channel box 1 is moved vertically. Consequently, the irradiated bow of the channel box 1 is small even if the channel box 1 has an original deflection produced during manufacture. Since the channel box 1 can be heat-treated by a single cycle of beta-quench treatment, the channel box 1 can be manufactured at a high production efficiency.

Figure 6:
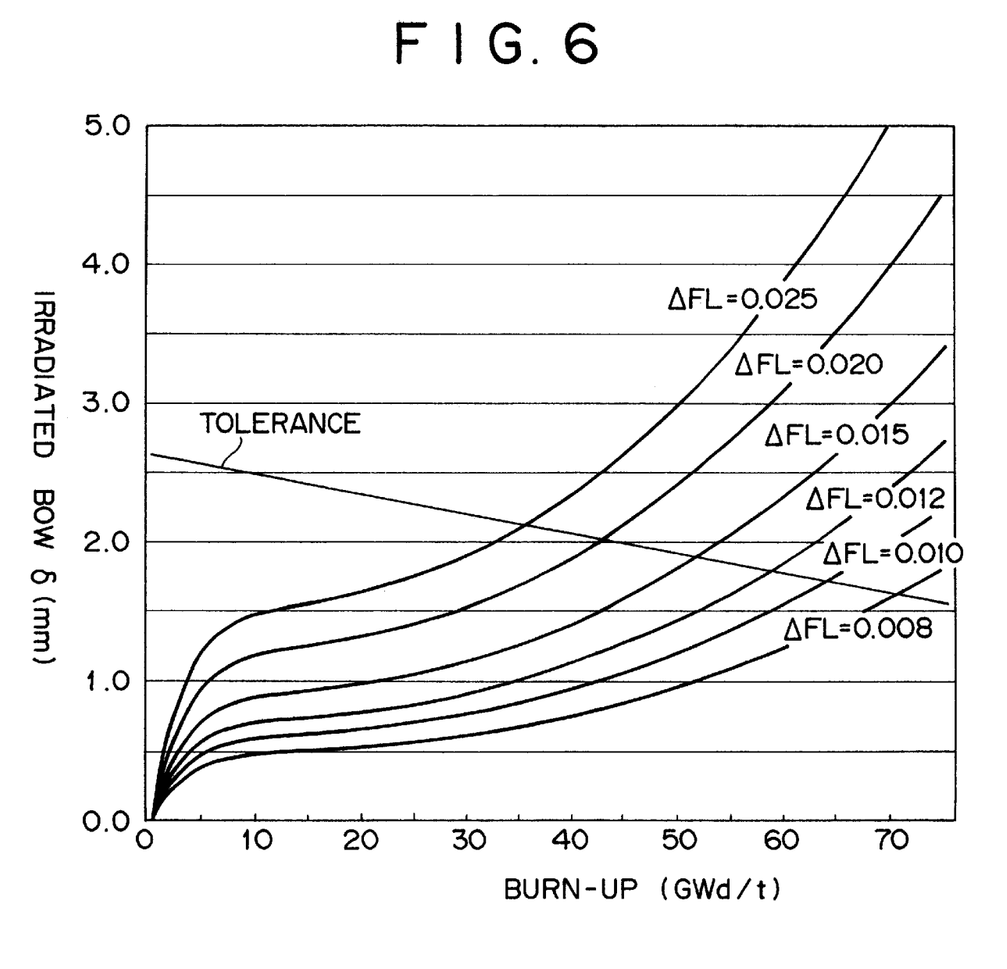
FIG. 6 is a graph showing the relation between burnup and irradiated bow of a fuel channel box.

The relation between an allowable difference ΔFL between the FL values of the opposite walls of the channel box 1 and burnup indicating a period of use will be explained with reference to FIG. 6. FIG. 6 shows the results of analysis of the dependence of irradiated bow δ of the channel box on burnup for ΔFL as a parameter. In FIG. 6, a tolerance corresponds to a clearance between a 120 mil channel box (wall thickness: 2.98 to 3.12 mm) for high burnup (45 to 55 GWd/t), and a control rod. When the irradiated bow δ is below the tolerance, the channel box will not interfere with the movement of the control rod but is used. The exposure bulge of the channel box is taken into consideration in determining the tolerance.

As shown in FIG. 6, the intersection of a curve for ΔFL=0.012 and the tolerance line corresponds to a burnup of 58.5 GWd/t and δ=1.8 mm, which signifies that the channel box can be used until burnup increases to 58.5 GWd/t when ΔFL≦0.012. The intersection of a curve for ΔFL=0.008 and the tolerance line corresponds to a burnup of 71 GWd/t and δ=1.62 mm, which signifies that the channel box can be used until burnup increases to 71 GWd/t when ΔFL≦0.008.

Figure 7:
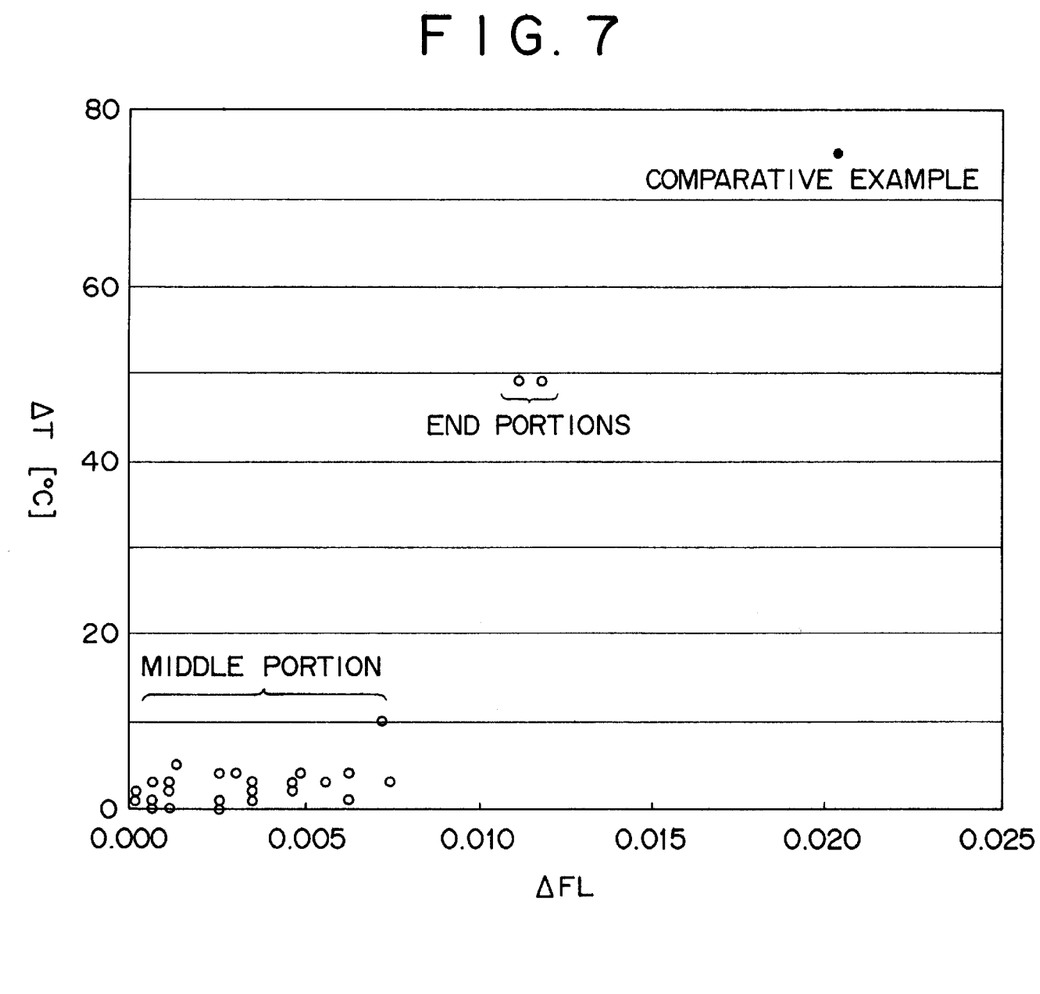
FIG. 7 is a graph showing the relation between the ΔFL and temperature difference ΔT between the opposite walls of a fuel channel box.

The relation between ΔFL between the opposite walls of the channel box and temperature difference ΔT will be described with reference to FIG. 7. FIG. 7 shows measured values obtained through experiments and showing the relation between ΔFL and ΔT. A channel box of a width of about 132 mm was used in the experiments. The temperature of a portion of each wall at about 45 mm from one end of the wall is used as the temperature of the wall. FL values portions of each wall at about 45 mm from the opposite ends of the wall were measured and the mean of the FL values was used as the FL value of the wall. The heating temperature was 1100° C. and the holding time was 10 s. The relation between ΔFL at the same longitudinal position (height) of the channel box and ΔT was determined on the basis of the measured temperatures and the FL values of the walls.

As shown in FIG. 7, ΔT=49° C. and ΔFL=0.011 to 0.012 at the opposite longitudinal ends of the channel box (blank circles). The temperature difference (difference in FL) is comparatively large because the opposite ends pass through the heating coil while the same is still being heated to the heating temperature and while the same is still being cooled from the heating temperature. At a longitudinal middle portion of the channel box, ΔT=0 to 10° C. and ΔFL=0 to 0.0075 (blank circles); that is, in the middle portion heated at the heating temperature of 1100° C., ΔT≦10° C. and ΔFL≦0.0075. In FIG. 7, a solid circle indicates a measured ΔFL=0.0205 of a comparative example when ΔT=75° C. It is known that ΔFL increases with ΔT.

It is known from FIGS. 6 and 7 that the channel box can be used until burnup increases to 55 GWd/t when the temperature difference ΔT between the opposite walls of the channel box is 50° C. or below and that the channel box can be used until burnup increases to 70 GWd/t when the temperature difference ΔT between the opposite walls of the channel box is 10° C. or below.

Although the foregoing embodiment is intended to reduce the temperature difference ΔT between the opposite walls to a minimum, the irradiated bow of the channel box remains small so that the channel box can be used for a period corresponding to a high burnup of 55 GWd/t when ΔT is 50° C. or below or the channel box can be used for a long period corresponding to a high burnup of 70 GWd/t when ΔT is 10° C. or below. Thus, the present invention extends the life of the fuel channel box and improves the reliability of the fuel channel box.

Although the foregoing embodiment moves only the heating coil for the adjustment of the heating distance, only the channel box may be used for the adjustment of the heating distance or both the heating coil and the channel box may be moved for the adjustment of the heating distance.

Although the processing conditions of the beta-quench treatment are the heating temperature of 1100° C. and the holding time of 10 s, the heating temperature may be any temperature in the range of 1050 to 1350° C. and the holding time may be any time in the range of 5 to 60 s.

Although the foregoing embodiment employs the heating coil moving device for moving the heating coil in a horizontal plane and the channel box moving device for longitudinally moving the channel box, a mechanism for moving the heating coil in a horizontal plane and moving the channel box longitudinally may be used instead of the heating coil moving device and the channel box moving device.

What is claimed is:

1. A fuel channel box manufacturing method comprising the steps of:
   heating a fuel channel box of a zirconium-base alloy at a temperature in a temperature range including β-phase temperatures by a heating coil; and
   cooling the heated fuel channel box;
   wherein distance between the heating coil and the fuel channel box is controlled based on temperature differences between opposite walls of the fuel channel box during the heating of the fuel channel box.

2. The fuel channel box manufacturing method according to claim 1, wherein the step of cooling the fuel channel box is controlled so that the walls of the channel box are cooled at a temperature dropping rate in the range of 100 to 250° C./s.

3. The fuel channel box manufacturing method according to claim 1, wherein the step of cooling the fuel channel box uses cooling water of a temperature in the range of 40 to 90° C.

4. The fuel channel box manufacturing method according to claim 1, wherein the temperature range including β-phase temperatures is a range of 1050 to 1200° C.

5. A fuel channel box manufacturing method comprising the steps of:

heating a fuel channel box of a zirconium-base alloy at a temperature in a temperature range including β-phase temperatures by a heating coil; and cooling the heated fuel channel box;

wherein a correction distance for correcting the distance between the heating coil and the fuel channel box is determined on the basis of the temperature difference between the opposite walls, and at least either the heating coil or the fuel channel box is moved by the correction distance.

6. The fuel channel box manufacturing method according to claim 5, wherein the step of cooling the fuel channel box is controlled so that the walls of the channel box are cooled at a temperature dropping rate in the range of 100 to 250° C./s.

7. The fuel channel box manufacturing method according to claim 5, wherein the step of cooling the fuel channel box uses cooling water of a temperature in the range of 40 to 90° C.

8. The fuel channel box manufacturing method according to claim 2, wherein the temperature range including β-phase temperatures is a range of 1050 to 1200° C.

9. A fuel channel box manufacturing method comprising the steps of:

heating a fuel channel box of a zirconium-base alloy at a temperature in the range of 1050 to 1350° C. by a heating coil; and cooling the heated fuel channel box;

wherein distance between the heating coil and the fuel channel box is controlled based on temperature differences between opposite walls of the fuel channel box during the heating of the fuel channel box.

* * * * *